(12) United States Patent
Yamazaki

(10) Patent No.: US 6,624,391 B2
(45) Date of Patent: Sep. 23, 2003

(54) METHOD FOR PRODUCING BOILED EGG-LIKE FOODS AND APPARATUS FOR PRODUCING THE SAME

(76) Inventor: Osamu Yamazaki, 2-27, Honcho 2-jo 9-chome, Higashi-ku, Sapporo, Hokkaido (JP)

( * ) Notice: Subject to any disclaimer, the term of this patent is extended or adjusted under 35 U.S.C. 154(b) by 134 days.

(21) Appl. No.: 09/790,761

(22) Filed: Feb. 22, 2001

(65) Prior Publication Data

US 2002/0006456 A1 Jan. 17, 2002

(30) Foreign Application Priority Data

Feb. 25, 2000 (JP) ......................................... 2000-050144

(51) Int. Cl.⁷ ................................ A47J 36/20; A21B 3/15; A21B 5/00
(52) U.S. Cl. ............................................ 219/411; 219/392
(58) Field of Search ................................. 219/411, 392, 219/406, 407, 409, 520, 544, 548

(56) References Cited

U.S. PATENT DOCUMENTS

| | | | | |
|---|---|---|---|---|
| 3,066,211 A | * | 11/1962 | Vogt ............................ | 219/553 |
| 3,581,653 A | * | 6/1971 | Boyer et al. .................. | 99/332 |
| 4,298,789 A | * | 11/1981 | Eichelberger et al. ...... | 219/406 |
| 4,839,502 A | * | 6/1989 | Swanson et al. ............ | 219/411 |
| 5,616,266 A | * | 4/1997 | Cooper ........................ | 219/407 |
| 6,037,572 A | * | 3/2000 | Coates et al. ............... | 219/543 |
| 6,392,203 B1 | * | 5/2002 | Schmidmayer ............. | 219/405 |

* cited by examiner

Primary Examiner—Joseph Pelham
(74) Attorney, Agent, or Firm—Adams & Wilks

(57) ABSTRACT

An apparatus for producing boiled egg-like foods has a case having metal plates and a space bounded by the metal plates. At least one egg tray is mounted in the space of the case for supporting eggs. Heating elements are connected to respective ones of the metal plates for uniformly heating the surfaces of the eggs at a temperature in the range of 65 to 90° C. An irradiating device irradiates the eggs with far infrared rays having a wavelength in the range of 3 to 30 μm.

20 Claims, 5 Drawing Sheets

METHOD FOR PRODUCING BOILED EGG-LIKE FOODS AND APPARATUS FOR PRODUCING THE SAME

BACKGROUND OF THE INVENTION

1. Field of the Invention

The present invention relates to a method for producing boiled egg-like foods utilizing irradiation of far infrared rays and to an apparatus for producing the same.

2. Background Information

Chicken eggs have been used as valuable nutrition sources for daily life. Chicken eggs are often boiled for eating and used, for example, as side dishes of a packed or box lunch for a school children's excursion or athletic meet. When boiled eggs are made in the home, in general, raw eggs are placed in a pot or the like and heated by boiling water.

After chicken eggs have been boiled for eating, the freshness of the boiled eggs tend to deteriorate rapidly. Accordingly, boiled eggs should be eaten soon after boiling before the freshness is deteriorated. However, people sometimes miss the opportunity to eat the boiled eggs before they lose freshness and even do not eat them before they eventually rot.

Thus, it is believed that boiled eggs are hardly stored for a long period of time under natural conditions as well as in a refrigerator due to the problem of freshness. If a long time has passed before boiled eggs are eaten or if the boiled eggs are stored without taking the environmental temperature into consideration, rotting of the boiled eggs is accelerated. It is understood that eating boiled eggs in a rotted state can endanger the health of individuals.

It is believed that eggs boiled by boiling water are low in storability, since miscellaneous bacteria tends to invade through fine pores of the eggshells. Particularly, when the boiled eggs are cooled by cold water, the invasion of miscellaneous bacteria is substantial, thereby further lowering the storability of boiled eggs.

As mentioned above, chicken eggs are used for various styles and purposes in the field of processed foods, but boiled eggs are limited in uses at the present stage. If long term storage of boiled egg-like processed foods becomes possible, these can be widely used for daily demand as well as nourishing foods at the time of emergency during disasters such as earthquakes or floods.

SUMMARY OF THE INVENTION

The present invention has been developed in view of the foregoing problems in the conventional art.

It is an object of the present invention to provide a method for producing boiled egg-like foods which can be stored for a long period of time under natural conditions without generating nasty smell and letting the eggs rot while maintaining the taste of the boiled eggs.

Another object of the present invention is to provide an apparatus for producing boiled egg-like foods and which has a simple construction, is easy to use and is economical to manufacture.

The foregoing and other objects of the present invention are carried out by a method for producing boiled egg-like foods comprising the steps of heating eggs, such as chicken eggs, under a dry-heating condition at a temperature of from 65 to 90° C., and irradiating the eggs thoroughly with far infrared electromagnetic waves having a wavelength in the range of from 3 to 30 μm.

According to the present invention, upon heating of the egg, the irradiated far infrared electromagnetic waves reach the depth of the egg, act on the molecules of water in the egg yolk, and initiate thermal motion, whereby the temperature of the egg yolk will be raised and coagulation will start. Further, carbon dioxide contained in the white part of the egg is expanded by heating, and the volume of the egg is increased. At the same time, sulfur-containing amino acid contained in the egg white is decomposed by heating and hydrogen sulfide is generated. The expanded carbon dioxide comes out of the egg through the pores of the eggshell together with the hydrogen sulfide and the egg white is coagulated.

By the foregoing process according to the present invention, the pores of the egg shell are hardly invaded by miscellaneous bacteria during coagulation of the egg white. Further, sterilization of the egg is also achieved during irradiation with the far infrared rays. By heating and irradiating the eggs with far infrared rays for about 1 to 2 hours, for example, the eggs are processed into boiled egg-like foods. The boiled egg-like foods produced by the method according to the present invention withstand storage at room temperature for about 30 to 50 days.

In another aspect, the present invention is directed to an apparatus for producing boiled egg-like foods. The apparatus comprises a case having a space surrounded by metal plates for irradiating far infrared rays and to which heating sources are closely attached, and an egg tray disposed within the case for supporting eggs to be subjected to the heating and irradiation process described above. The apparatus is constructed such that the surfaces of the eggs placed in the egg tray can be uniformly irradiated with the far infrared rays.

BRIEF DESCRIPTION OF THE DRAWINGS

The foregoing summary, as well as the following detailed description of a preferred embodiment of the invention, will be better understood when read in conjunction with the accompanying drawings. For the purpose of illustrating the invention, there is shown in the drawings an embodiment which is presently preferred. It should be understood, however, that the invention is not limited to the precise arrangement and instrumentalities shown. In the drawings.

DETAILED DESCRIPTION OF PREFERRED EMBODIMENT

While this invention is susceptible of embodiments in many different forms, this specification and the accompanying drawings disclose only one form as an example of the use of the invention. The invention is not intended to be limited to the embodiment so described, and the scope of the invention will be pointed out in the appended claims.

FIGS. 1–7 show an apparatus 1 for producing boiled egg-like foods according to the present invention. The preferred embodiment of the method and apparatus for producing boiled egg-like foods according to the present invention is described below with a specific application to chicken eggs. However, it will be appreciated by those of ordinary skill in the art that the following preferred embodiment of the method and apparatus for producing boiled egg-like foods is also particularly well adapted for eggs from other animals, such as, for example, any warm-blooded, egg-laying, feathered vertebraes.

Figure 1:
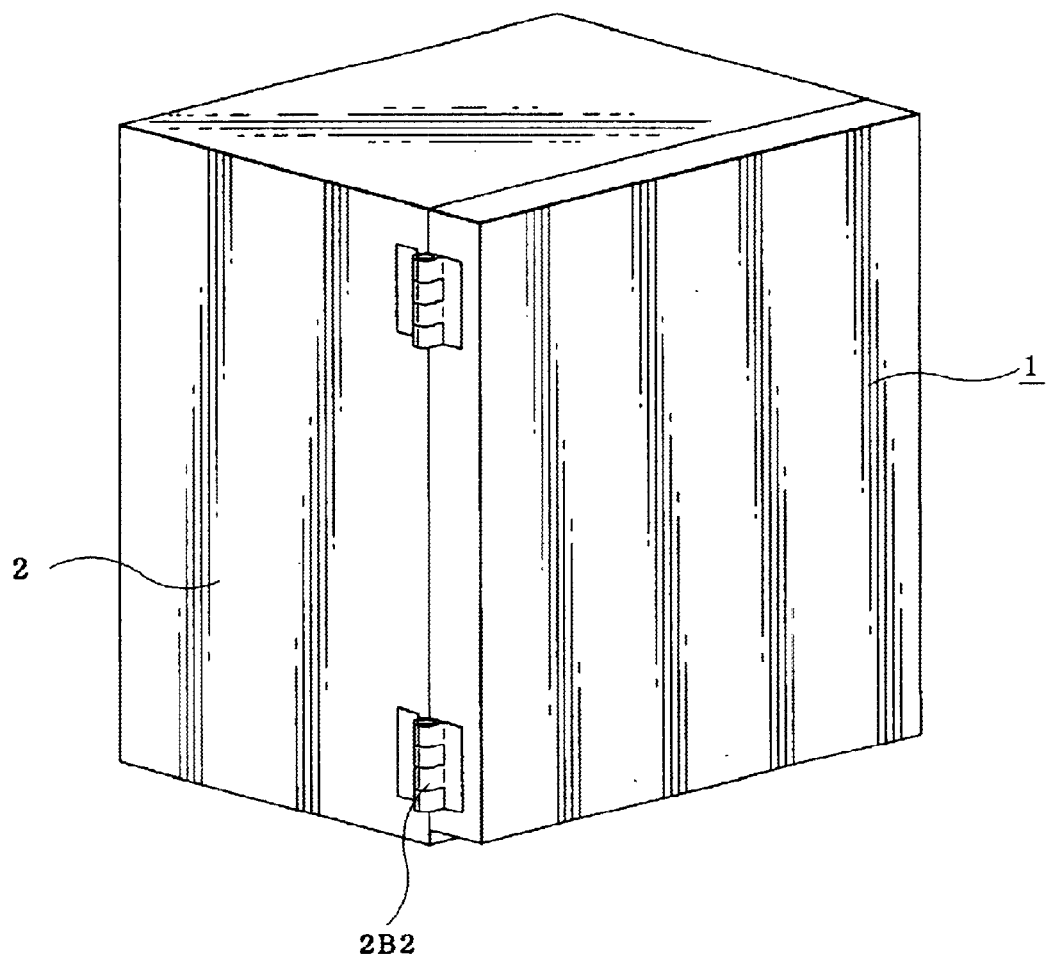
FIG. 1 is a perspective view of an apparatus for producing boiled egg-like foods according to the present invention.
Figure 2:
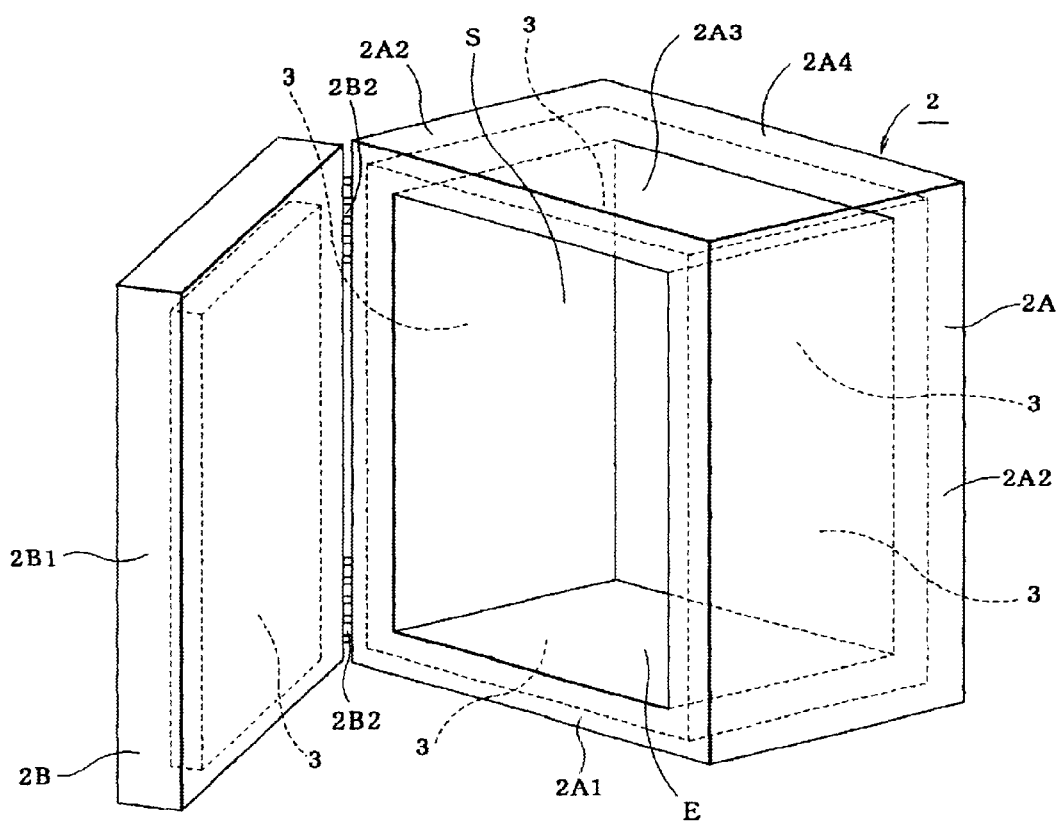
FIG. 2 is a perspective view of the apparatus shown in FIG. 1 in a state where a door is open and an egg tray is omitted.

Referring to FIGS. 1–2, the apparatus 1 comprises a case 2 having an interior space S, internal multi-layered films 3 bounding the interior space S, and egg trays 4 disposed in the interior space S for supporting chicken eggs 5 which are to be subjected to a process described below for producing boiled egg-like foods according to the present invention. The case 2 comprises a case body 2A having a front open section E and a door 2B for opening and closing the open section E. The case body 2A comprises a planar floor plate 2A1 having a generally square shape, right and left side walls 2A2 connected to right and left edges of the floor plate 2A1, a ceiling plate 2A3 disposed between and connected to the side walls 2A2, and a rear wall 2A4 connected to the floor plate 2A1, the side walls 2A2 and the ceiling plate 2A3. The multi-layered films 3 are attached to respective ones of an inner surface of a respective one of the floor plate 2A1, the side walls 2A2, the ceiling plate 2A3 and the rear wall 2A4.

The door 2B comprises a door plate 2B1 disposed at the front open section E of the case body 2A, and the door 2B is connected to the case body 2A in a manner such that it is capable of opening and closing the front open section E, such as by hinges 2B2 or the like. One of the multi-layered films 3 is attached on an inner surface of the door plate 2B1.

Figure 3:
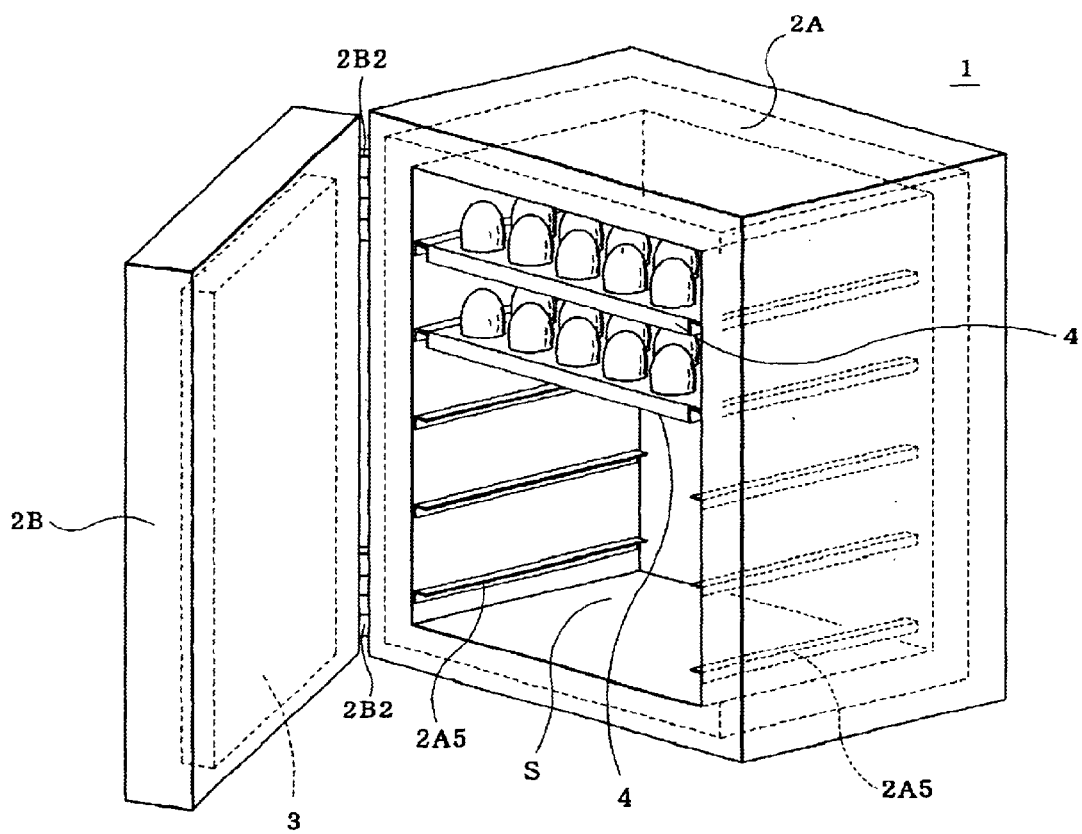
FIG. 3 is a perspective view of the apparatus shown in FIG. 1 in a state where a door is open.
Figure 4:
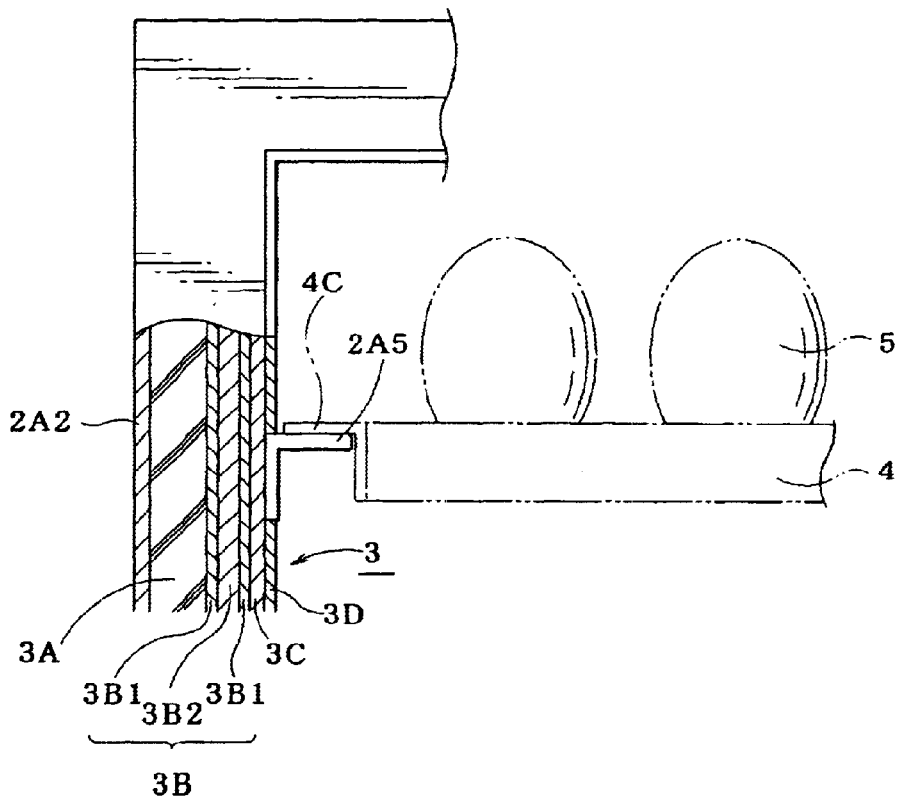
FIG. 4 is an enlarged front view of the apparatus shown in FIG. 1 in a state where a case body is partially cutaway.

Referring to FIGS. 3 and 4, right and left flanges 2A5 are mounted on the inner surfaces of the side walls 2A2 for supporting opposite ends of the egg trays 4. The flanges 2A5 are attached to the inner surfaces of the side walls 2A2, with predetermined distances therebetween from a lower side toward an upper side of the sidewalls, using suitable connecting means, such as welding or hardware.

Figure 5:
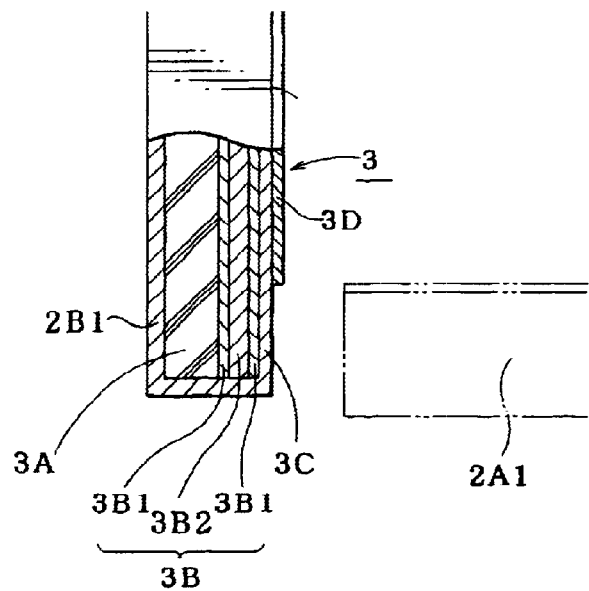
FIG. 5 is an enlarged side view of the apparatus shown in FIG. 1 in a state where a cover is partially cutaway.

Referring to FIGS. 4 and 5, each of the multi-layered films 3 comprises a heat insulating material 3A, a planar heating element 3B, a metal plate 3C, and an anodized layer 3D capable of irradiating far infrared electromagnetic waves (hereinafter "far infrared rays"). The heat insulating material 3A, heating element 3B, metal plate 3C and anodized layer 3D are sequentially laid from the case body 2A side or from the door plate 2B1 side toward the interior of the case 1. Thus, the inner wall of the case 1, which is formed by the inner surface of each of the door plate 2B1, floor plate 2A1, side walls 2A2, ceiling plate 2A3 and rear wall 2A4, comprises the metal plate 3C, the anodized layer 3D disposed on a first main surface of the metal plate 3C, and the heating element 3B disposed on a second main surface of the metal plate 3C opposite the first main surface.

Figure 6:
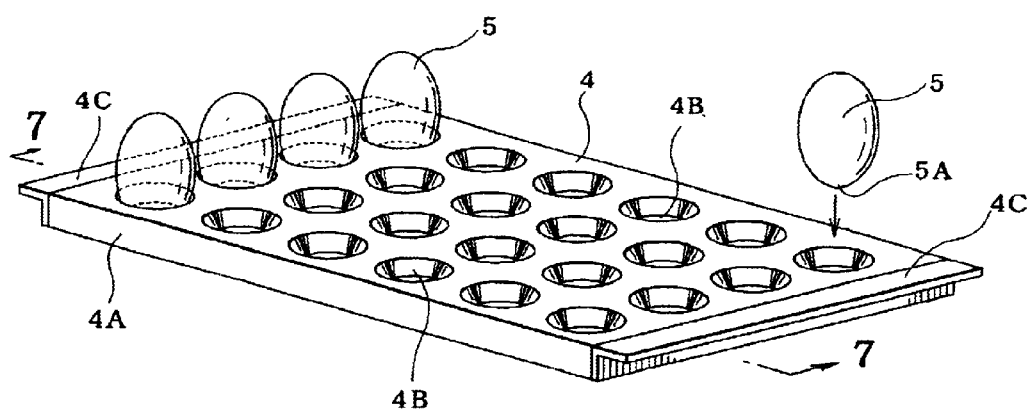
FIG. 6 is a perspective view of an egg tray.
Figure 7:
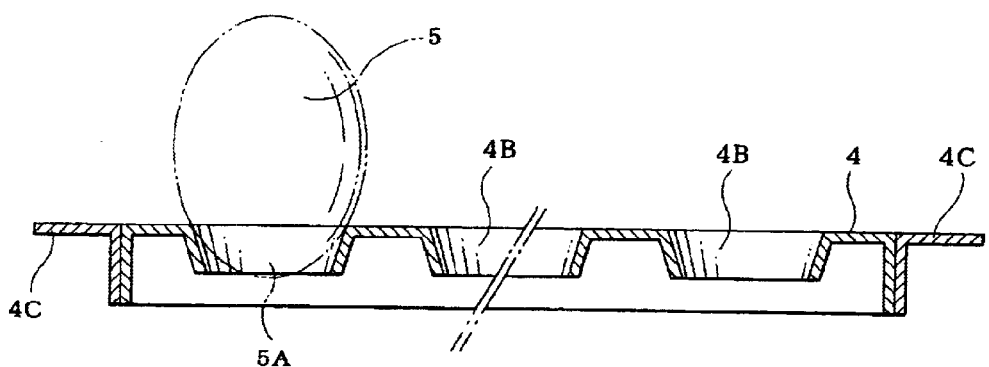
FIG. 7 is an enlarged, partially cut-away and vertical cross-sectional view taken along line 7—7 in FIG. 6.

Referring to FIGS. 6 and 7, each of the egg trays 4 comprises a base member 4A having receiving holes 4B for receiving the chicken eggs 5. The shape of the receiving holes 4B are selected to conform to the shape of the chicken eggs 5. In the present embodiment, for example, each of the receiving holes 4B is generally tapered-shaped for accommodating a pointed head portion 5A of the chicken egg 5. The receiving holes 4B are spaced apart a predetermined distance so that the chicken eggs 5 are disposed in the receiving holes 4B with a predetermined distance therebetween.

Frame members 4C are connected to opposite sides of each of the base member 4A for engaging the flanges 2A5 mounted on the side walls 2A2 of the case body 2A so that the egg trays 4 are supported horizontally by the flanges 2A5 in the interior space S of the case body 2A. Thus, as shown in FIG. 3, the egg trays 4 are supported in the interior space S of the case body 2A via the flanges 2A5 and the frame members 4C of the egg trays. By this construction, the egg trays 4 can be selectively inserted and removed from the interior space S of the case body 2A.

The base member 4A of each of the egg trays 4 is preferably made from a metallic wire netting material which is capable of irradiating far infrared rays. Preferably, the metallic wire netting material comprises an aluminum wire netting having an anodized layer.

According to the present invention, the heating elements 3B of the multi-layered film 3 function as a heat source for heating the space S of the case 2 to heat the chicken eggs 5 disposed on the trays 4 disposed in the space S. The heating elements 3B also function as a source for activating the anodized layers 3D to cause them to emit and irradiate far infrared rays when the space S of the case 2 reaches a preselected temperature. The heating elements 3B are driven by an electric power supply (not shown). Thus, when the heating elements 3B are driven (i.e., heated) so that the space S in the case 2 reaches a preselected temperature, the anodized layers 3D irradiate far infrared rays within the space S. The irradiated far infrared rays are reflected between the inner surfaces of the case 2 so that the chicken eggs 5 are thoroughly irradiated with far infrared rays. The heating temperature for the chicken eggs 5 can be freely controlled, for example, by automatically adjusting the driving voltage applied to the heating element 3B in proportional relation to a change in the resistance of a resistance thermometer disposed in the space S of the case 2. The resistance thermometer used may be of a conventionally known type, such as a platinum resistance thermometer. By controlling the degree of heating in this manner, it is possible to obtain various boiled egg-like foods each having a different degree of boiling.

A specific embodiment of a method and apparatus for producing boiled egg-like foods according to the present invention will be described below.

The case body 2A of the case 2 has a construction as described above and the components are made of iron. As shown in FIG. 3, each heating element 3B of the multi-layered films 3 comprises a heater 3B2 and heat-resistant insulating coatings 3B1 disposed on opposite main surfaces of the heater 3B2. Each of the heat-resistant insulating coatings 3B1 is made from a polyamide heat-resistant insulating film or a similar heat-resistant film. The polyamide heat-resistant insulating films can withstand a temperature as high as 200° C. However, such a high temperature is not required for the apparatus of the present invention, and delicious boiled egg-like foods can be obtained by applying a temperature ranging from 65 to 90° C. and irradiating with far infrared rays having a wavelength ranged from 3 to 30 μm.

The heating element 3B is disposed on the second main surface of the metal plate 3C and suppresses an increase in the surface temperature of the metal plate 3C which has the anodized layer 3D disposed on the first main surface thereof. By this construction, the internal temperature within the space S of the case 2 can be maintained appropriately.

The metal plate 3C preferably comprises an aluminum plate. The anodized layer 3D is disposed on the surface of the aluminum plate 3C and preferably has a composition of from 0.3 to 4.3 wt % of manganese (Mn), if necessary from 0.05 to 6.0 wt % of magnesium (Mg), and aluminum (Al) as the balance, and a distribution of depositions of an Al—Mn type intermetallic compound having a particle size of from 0.01 to 0.3 $\mu$m.

During production of the boiled egg-like foods according to the present invention, the eggs 5 supported by the trays 4 in the space S of the case 2 are heated under a dry-heating condition and irradiated with far infrared rays. More specifically, when the heating elements 3B, which are closely attached to the metal plates 3C as part of the inner wall of the case 2, are heated so that the average temperature in the space S within the inner walls of the case 2 is within a range of from 65 to 90° C., far infrared rays having a wavelength ranging from 3 to 30 $\mu$m are produced and irradiated inwardly from the anodized layers 3D provided on the surface of the metal plates 3C. The irradiated far infrared rays are reflected between the inner wall surfaces of the case 2 which face one another such as, for example, between the surfaces of the ceiling plate 2A3 and the floor plate 2A1 and between the surfaces of the side walls 2A2. As a result, the eggs disposed within the space S are thoroughly irradiated with the far infrared rays. Upon heating, coagulation of the egg white and the egg yolk is initiated, and the irradiated far infrared rays reach the depth of the eggs, act on molecules of water in the egg white, and initiate thermal motion, whereby the temperature of the egg will be raised and coagulation of the egg will be accelerated.

Within 30 to 40 minutes after the start of heating, the sulfur-containing amino acid in the egg white is decomposed by heating, the sulfur changes to hydrogen sulfide, and carbon dioxide in the egg white is vaporized and increases the internal pressure of the egg. As a result, the expanded carbon dioxide comes out of the egg through the fine pores of the eggshell together with the hydrogen sulfide. As a result, the egg white is coagulated and miscellaneous bacteria can hardly invade through the pores of the eggshell. By conducting the foregoing process for about 1.5 hours, the chicken eggs are processed into boiled egg-like foods having excellent storability.

The boiled egg-like foods thus obtained were subjected to inspection of microorganisms after 3 weeks. As a result of subjecting the chicken eggs to the foregoing process according to the present invention, it was observed that the number of general living microorganisms was 300 or less, the presence of a group of *escherichia coli* was negative, *staphylococcus aureus* was negative, salmonella was negative, and the total quality of the egg-like foods was determined to be standard or higher. Even when the boiled egg-like foods were left to stand in room for a long period of time of from 30 to 50 days, no odor or rot was observed.

By the foregoing apparatus and process according to the present invention, boiled egg-like foods are obtained having excellent storability. The apparatus for producing the boiled egg-like foods is simple to operate and fabricate since the number of parts is small. Accordingly, boiled egg-like foods according to the present invention can be produced at low costs.

From the foregoing description, it can be seen that the present invention comprises an improved method and apparatus for producing boiled egg-like foods. It will be appreciated by those skilled in the art that obvious changes can be made to the embodiment described in the foregoing description without departing from the broad inventive concept thereof. It is understood, therefore, that this invention is not limited to the particular embodiment disclosed, but is intended to cover all obvious modifications thereof which are within the scope and the spirit of the invention as defined by the appended claims.

I claim:

1. An apparatus for producing boiled egg-like foods, comprising: heating means for heating eggs at a temperature in the range of 65 to 90° C.; and irradiating means for irradiating the eggs with far infrared rays having a wavelength in the range of 3 to 30 $\mu$m.

2. An apparatus according to claim 1; further comprising a case having metal plates and a space bounded by the metal plates; and at least one egg tray mounted in the space of the case for supporting the eggs.

3. An apparatus according to claim 2; wherein the at least one egg tray comprises a plurality of egg trays mounted in the space of the case for supporting the eggs.

4. An apparatus according to claim 1; wherein the heating means comprises a plurality of heating elements for uniformly heating the surfaces of the eggs.

5. An apparatus according to claim 4; wherein the irradiating means comprises a plurality of anodized layers each disposed over a respective one of the heating elements for uniformly irradiating the surfaces of the eggs with the far infrared rays.

6. A method according to claim 1; wherein the eggs comprise chicken eggs.

7. An apparatus for producing boiled egg-like foods, comprising: a case having metal plates and a space bounded by the metal plates; at least one egg tray mounted in the space of the case for supporting a plurality of eggs; a plurality of heating elements each connected to a respective one of the metal plates for uniformly heating the surfaces of the eggs at a temperature in the range of 65 to 90° C.; and irradiating means for irradiating the eggs with far infrared rays having a wavelength in the range of 3 to 30 $\mu$m.

8. An apparatus according to claim 7; wherein the irradiating means comprises a plurality of anodized layers each disposed over a respective one of the heating elements for uniformly irradiating the surfaces of the eggs with the far infrared rays.

9. An apparatus for producing boiled egg-like foods, comprising:

a case comprised of a case body having an open section and a door for opening and closing the open section, the case body having a plurality of inner surfaces defining an interior space of the case;

at least one egg tray removably mounted in the space of the case for supporting a plurality of eggs; and a plurality of multi-layered films each connected to a respective inner surface of the case body for conducting heat to heat the eggs and irradiating the eggs with far infrared rays.

10. An apparatus according to claim 9; wherein the egg tray comprises a plurality of holes each for receiving a respective one of the eggs.

11. An apparatus according to claim 9; wherein each of the multi-layered films comprises an insulating material, a heating element disposed on the insulating material, a metal plate disposed on the heating element, and an anodized film for irradiating far infrared rays disposed on the metal plate.

12. An apparatus according to claim 11; wherein the anodized film, the metal plate, the heating element and the insulating material extend sequentially from the inner surfaces of the case body in a direction toward an outer surface of the case.

13. An apparatus according to claim 12; wherein the egg tray is made of a metallic wire netting material having an anodized film for irradiating far infrared rays, the egg tray having a plurality of holes spaced apart by a predetermined distance for receiving a respective one of the eggs.

14. An apparatus for producing boiled egg-like foods, comprising:
- a case comprised of a case body having an open section and a door for opening and closing the open section, the case body having a floor plate, right and left side walls connected to right and left edges, respectively, of the floor plate, a ceiling plate disposed between and connected to the right and left side walls, and a rear wall connected to the floor plate, the side walls and the ceiling plate;
- at least one egg tray removably mounted in a space bounded by the floor plate, side walls, ceiling plate and rear plate of the case body for supporting a plurality of eggs; and
- a plurality of multi-layered films each connected to a respective inner surface of the floor plate, side walls, ceiling plate and rear plate of the case body for conducting heat to heat the eggs and irradiating the eggs with far infrared rays.

15. An apparatus according to claim 14; further comprising a plurality of flanges connected to the side walls of the case body for supporting the egg tray in the space of the case body.

16. An apparatus according to claim 14; wherein the egg tray comprises a plurality of holes each for receiving a respective one of the eggs.

17. An apparatus according to claim 14; wherein each of the multi-layered films comprises an insulating material, a heating element disposed on the insulating material, a metal plate disposed on the heating element, and an anodized film for irradiating far infrared rays disposed on the metal plate.

18. An apparatus according to claim 17; wherein the anodized film, the metal plate, the heating element and the insulating material extend sequentially from the inner surfaces of the case body in a direction toward an outer surface of the case.

19. An apparatus according to claim 14; wherein the egg tray is made of a metallic wire netting material having an anodized film for irradiating far infrared rays, the egg tray having a plurality of holes spaced apart by a predetermined distance for receiving a respective one of the eggs.

20. An apparatus according to claim 14; further comprising means for adjusting the degree of heating of the multi-layered films.

* * * * *